(12) United States Patent
Liu (10) Patent No.: US 7,224,941 B2
(45) Date of Patent: May 29, 2007

(54) SYSTEM AND METHOD FOR MULTI-PATH SIMULATION (75) Inventor: I-Ru Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 764 days.

(21) Appl. No.: 10/687,641

(22) Filed: Oct. 20, 2003

(65) Prior Publication Data

US 2005/0085223 A1    Apr. 21, 2005

(51) Int. Cl.
*H04B 17/00* (2006.01)

(52) U.S. Cl. .................. 455/67.11; 455/67.13; 455/67.14; 455/423; 455/424; 455/226.1; 455/575.7; 370/241; 370/251; 370/400; 703/13; 703/14; 324/309

(58) Field of Classification Search ........... 455/67.11, 455/226.1, 423, 424, 67.13, 67.14, 575.5, 455/575.7, 101; 370/241, 251, 252, 400
See application file for complete search history.

(56) References Cited

U.S. PATENT DOCUMENTS

| | | | | |
|---|---|---|---|---|
| 5,838,949 A | * | 11/1998 | Hassoun | 703/13 |
| 5,875,196 A | * | 2/1999 | Chakradhar et al. | 714/724 |
| 5,894,421 A | * | 4/1999 | Yamaguchi et al. | 716/6 |
| 6,009,256 A | * | 12/1999 | Tseng et al. | 703/13 |
| 6,026,230 A | * | 2/2000 | Lin et al. | 703/13 |
| 6,134,516 A | * | 10/2000 | Wang et al. | 703/27 |
| 6,142,682 A | * | 11/2000 | Skogby | 703/26 |
| 6,724,730 B1 | * | 4/2004 | Mlinarsky et al. | 370/241 |
| 6,959,250 B1 | * | 10/2005 | Shimazaki et al. | 702/75 |

* cited by examiner

*Primary Examiner*—Marceau Milord
(74) *Attorney, Agent, or Firm*—Troxell Law Office, PLLC (57) ABSTRACT

The present invention provides a system and method for multi-path simulation that employs a shielded anechoic chamber to avoid external electromagnetic interference and other uncontrollable transmission paths generated in testing, and divides and adjusts a signal into multiple simulation signals to simulate the attenuations and delays generated in multi-path transmission of the signals. The shielded anechoic chamber includes a turntable, controlled by a control unit, for carrying a wireless communication device to be tested and for changing the reception azimuth of the device, thereby measuring the electric wave transceiving of the device.

24 Claims, 5 Drawing Sheets

SYSTEM AND METHOD FOR MULTI-PATH SIMULATION

BACKGROUND OF THE INVENTION (a). Field of the Invention

The present invention relates in general to multi-path simulation, and more particularly to a system and method that employs a shielded anechoic chamber to avoid external electromagnetic interference (EMI), and divides a signal into multiple simulation signals to simulate the signal attenuation and delay during multi-path transmission.

(b). Description of the Prior Arts

In recent years, cellular phones and wireless local area networks (WLAN) are in widespread use with the rapid development of wireless communication technologies. In comparison with the signal transmission with a single physical path, the wireless signal transmission has an intrinsic multi-path phenomenon. The multi-path phenomenon means the wireless signal reaching the receiving antenna by two or more paths. The phenomenon results in the constructive or destructive interference, and phase shifting of the signal, caused by the refraction, and the reflection from objects, such as buildings and obstacles. The phenomenon exists in most real environments and would increase the complexity and instability of signal transceiving.

However, for the manufacturers of cellular phones, wireless local area networks, etc., the simulation of signal transceiving of their products is mostly performed in the environments whose testing conditions cannot be precisely controlled (e.g. open space). It is very hard to provide reliable testing reports for the products used in the real environments because external EMI and superfluous reflection paths cannot be avoided in these environments. Moreover, the testing operation may be limited by the space characteristics of these environments. In some cases, channel emulators are used to simulate the real environments, but they fail to test the important feature of antenna diversity since they operate in the cable mode and antennas of communication devices to be tested are bypassed. Therefore, there is an urgent need for a solution to simulate the multi-path phenomenon, thereby testing signal transceiving of the products in the real environments and then providing useful testing results for product development.

In view of this, the present invention provides a system and method for multi-path simulation that can avoid external EMI and superfluous reflection paths and operate without the limits of space for testing.

SUMMARY OF THE INVENTION

An object of the present invention is to provide a system for multi-path simulation. The system includes a signal generator for generating a signal and a signal-simulating unit, coupled to the signal generator, for dividing and adjusting the signal into N simulation signals in N ways to simulate attenuations and delays resulted from the transmission of the signal in N paths, where N is an integer larger than one. The system also includes a shielded anechoic chamber containing N antennas, which are coupled to the signal-simulating unit and used to transmit the N simulation signals respectively.

Another object of the present invention is to provide a method for multi-path simulation. The method includes generating a signal and dividing and adjusting the signal into N simulation signals in N ways to simulate attenuations and delays resulted from the transmission of the signal in N paths, where N is an integer larger than one; transmitting the N simulation signals by N antennas respectively, where the N antennas are deployed in a shielded anechoic chamber; and receiving the N simulation signals by a communication device deployed within the shielded anechoic chamber.

The present invention employs the shielded anechoic chamber to avoid external EMI and superfluous reflection paths during testing. The internal walls of the chamber are composed of particular material for absorbing most energy of the signal penetrating the internal walls and reducing the strength of the reflected signal significantly. In view of the signal attenuations due to the transmissions within the chamber space and other circuits, the present invention also employs the signal-simulating unit to attenuate transmitted signals, thereby simulating the attenuations resulted from the transmission in physical space. Thus, the real electromagnetic environment can be simulated without limits of the chamber size, and various radio experiments and measurements may be performed within the simulated environment to obtain reliable results.

Moreover, a further object of the present invention is to provide a method for measuring the diversity gain of a communication device. The communication device is able to switch between a single antenna mode and an antenna diversity mode and is deployed within a shielded anechoic chamber. The method comprising steps of: setting the communication device to the single antenna mode; generating a testing signal; attenuating the testing signal by a first attenuation setting; dividing and adjusting the attenuated testing signal into N simulation signals in N ways to simulate attenuations and delays resulted from the transmission of the testing signal in N paths, where N is an integer larger than one; transmitting the N simulation signals by N antennas deployed within the shielded anechoic chamber; receiving the N simulation signals by the communication device; measuring a signal parameter received by the communication device to acquire a reference value; switching the communication device to the antenna diversity mode and attenuating the testing signal by a second attenuation setting to adjust the signal parameter equal to the reference value; and calculating a difference between the first and second attenuation settings to obtain the diversity gain of the communication device.

BRIEF DESCRIPTION OF THE DRAWINGS

FIG. 3 is a flow chart of the application for measuring the antenna diversity gain by using the system 10a.

DETAILED DESCRIPTION OF THE PRESENT INVENTION

This section will explain the present invention in detail with preferred embodiments and appended drawings, and also describes an application of the present invention, i.e. the measurement of the diversity gain of a wireless communication device.

Figure 1A:
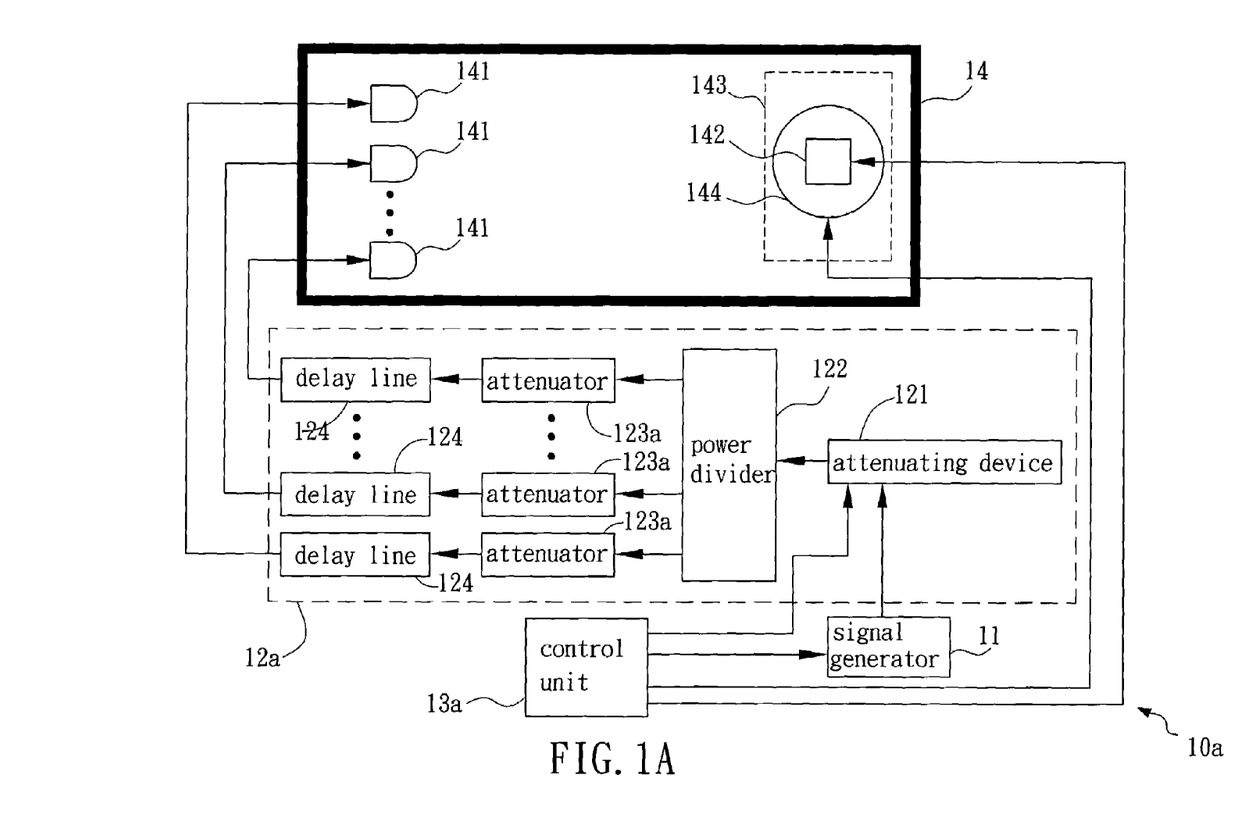
FIG. 1A is a block diagram showing a preferred embodiment of the system for multi-path simulation according to the present invention.

FIG. 1A is a block diagram showing a preferred embodiment of the system for multi-path simulation according to the present invention. In FIG. 1A, the system 10a for multi-path simulation is used to simulate a wireless communication space with N paths (N is an integer larger than one). The system 10a includes a signal generator 11 for generating a signal and a signal-simulating unit 12a, coupled to the signal generator 11, for dividing and adjusting the signal into N simulation signals in N ways to simulate attenuations and delays resulted from the transmission of the signal in the N paths. The system also includes a control unit 13a, coupled to the signal generator 11, for controlling the generation of the signal. The system also includes a shielded anechoic chamber 14 for avoiding external EMI and superfluous reflection paths and minimizing the useless reflection effects within the chamber 14.

The signal-simulating unit 12a includes an attenuating device 121 for attenuating the signal, generated by the signal generator 21, to generate an attenuated signal. The signal-simulating unit 12a also includes a power divider 122, coupled to the attenuating device 121, for dividing the attenuated signal into N attenuated sub-signals. The signal-simulating unit 12a also includes N attenuators 123a, coupled to the power divider 122, for attenuating the N attenuated sub-signals respectively to simulate the attenuations resulted from the transmission of the signal in the N paths. The signal-simulating unit 12a also includes N delay lines 124, coupled to the N attenuators 123a respectively, for delaying the N attenuated sub-signals to simulate the delays resulted from the transmission of the signal in the N paths.

In another embodiment, one of the N ways is selected as the reference way to simulate a direct path, and the delay line 124 on the reference way may be omitted. In addition, when N is two, a phase shifter is added onto the reference way to adjust the phase of the attenuated sub-signal therein, thereby simulating the phase offset resulted from the transmission of the signal in the two paths.

In FIG. 1A, the control unit 13a is also coupled to the attenuating device 121. The attenuating device 121 may be a step attenuator whose attenuation setting can be stepwise adjusted by the control unit 13a, thereby facilitating the simulation of signal attenuation during transmission in a wireless communication space. The larger attenuation setting simulates a longer distance of the signal transmission. Besides, the control unit 13a can also be coupled to the N attenuators 123a (not shown in FIG. 1A), thereby controlling the attenuation settings thereof.

The shielded anechoic chamber 14 contains N antennas 141, coupled to the N delay lines 124 respectively, for transmitting the N simulation signals. The chamber 14 also contains a communication device 142 for receiving the N simulation signals. Directional antennas, such as horn antennas, can be used for the N antennas 141 to form an antenna array.

The shielded anechoic chamber 14 also contains a quiet zone 143 where the communication device 142 is deployed. Within the quiet zone 143, which is due to the characteristics of the chamber 14, the signals from the antennas 141 are mainly propagated to the communication device 142 without any reflection (i.e. direct path), and the reflected signals in most indirect paths are lowered significantly. Therefore, better simulation results can be acquired by deploying the communication device 142 in the quiet zone 143.

The shielded anechoic chamber 14 also contains a turntable 144 for setting the communication device 142 and changing the reception azimuth of the communication device 142. The reception azimuth influences the features of signal reception of the communication device 142, such as antenna diversity effects, radiation patterns, etc., thus these features at different azimuths can be measured by rotating the turntable 144.

To obtain better simulation results, the system 10a adopts a Golden Sample of the communication device 142 as the signal generator 11. The Golden Sample conforms to associated standards and specifications much closer than the communication device 142, thus its signal quality is better for testing. Besides, a vector signal generator, combined with a power amplifier occasionally, can also be used as the signal generator 11 to generate signals more accurately and variously.

Please refer to FIG. 1A again. The control unit 13a is also coupled to the turntable 144, thereby controlling the rotation angle of the turntable 144. The control unit 13a is also coupled to the communication device 142, thereby acquiring signal properties of the communication device 142. Here the signal properties may include signal strength, signal quality parameter, frame error rate, and throughput, etc. Accordingly, the control unit 13a can rotate the turntable 144 to measure the antenna diversity effects and radiation patterns at different azimuths, and acquire the signal properties for further analysis, in addition to controlling the signal generation and the signal attenuation setting.

Figure 1B:
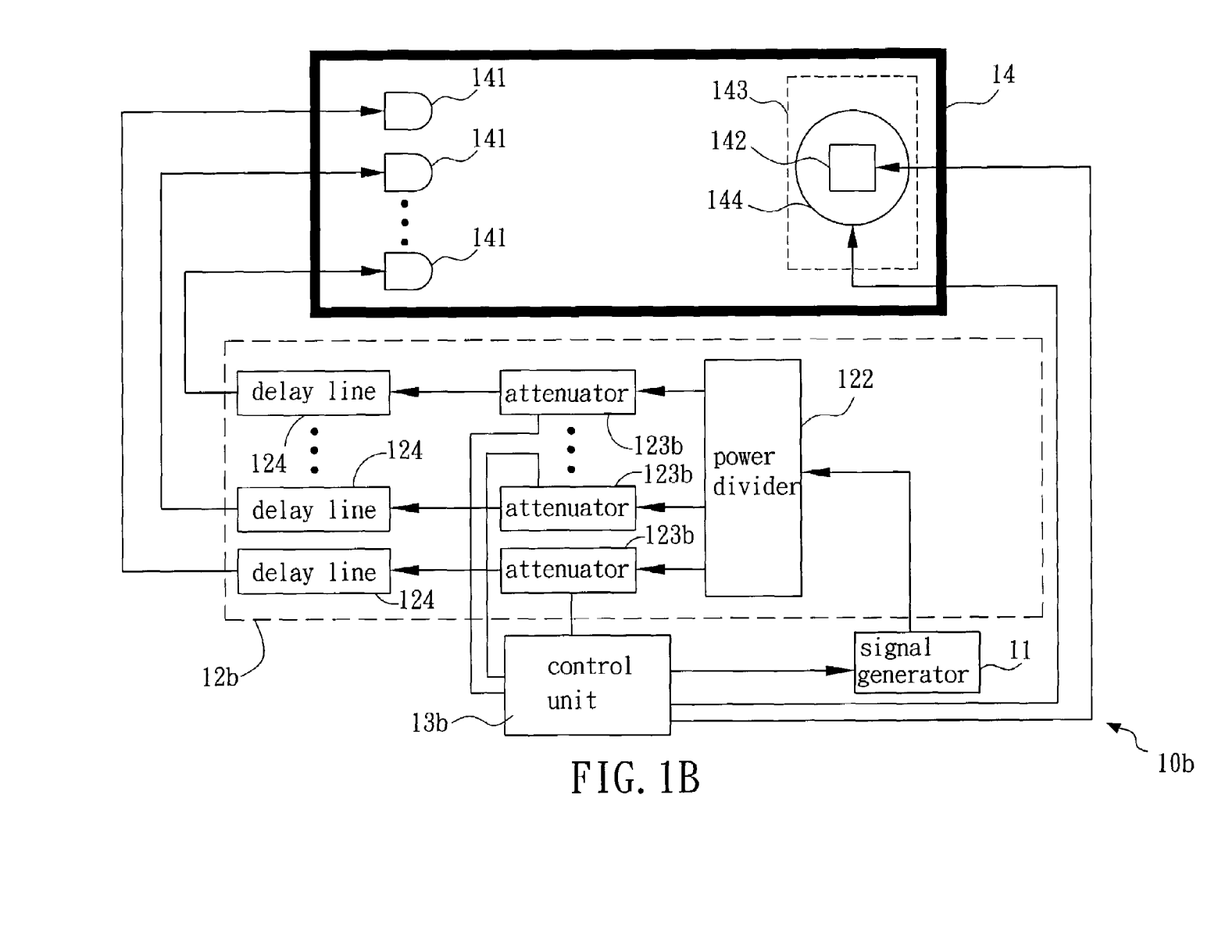
FIG. 1B is a block diagram showing another preferred embodiment of the system for multi-path simulation according to the present invention.

FIG. 1B is a block diagram showing another preferred embodiment of the system for multi-path simulation according to the present invention. In comparison with FIG. 1A, the system 10b of FIG. 1B uses attenuators 123b to combine the attenuating device 121 and the attenuators 123a of FIG. 1A. Thus, in the signal-simulating unit 12b, the power divider 122 is directly coupled to the signal generator 11 and divides the signal generated therefrom into N sub-signals; the N attenuators 123b are coupled to the power divider 122, and attenuate the N sub-signals respectively to simulate the attenuations resulted from the signal transmission in the N paths; the N delay lines 124 are coupled to the N attenuators 123b respectively, and delay the N attenuated sub-signals to simulate the delays resulted from the signal transmission in the N paths. Similarly, the delay line 124 on a reference way selected from the N ways can be omitted in this embodiment. And when N is two, a phase shifter may also be added onto the reference way to adjust the phase of the sub-signal therein, thereby simulating the phase offset resulted from the signal transmission in the two paths.

Moreover, in FIG. 1B, the control unit 13b is coupled to the N attenuators 123b to adjust the attenuation settings thereof respectively. The other operation details of the control unit 13b are the same as the control unit 13a of FIG. 1A. The composition and operation of the shielded anechoic chamber 14 in FIG. 1B is also the same as that in FIG. 1A.

Figure 2:
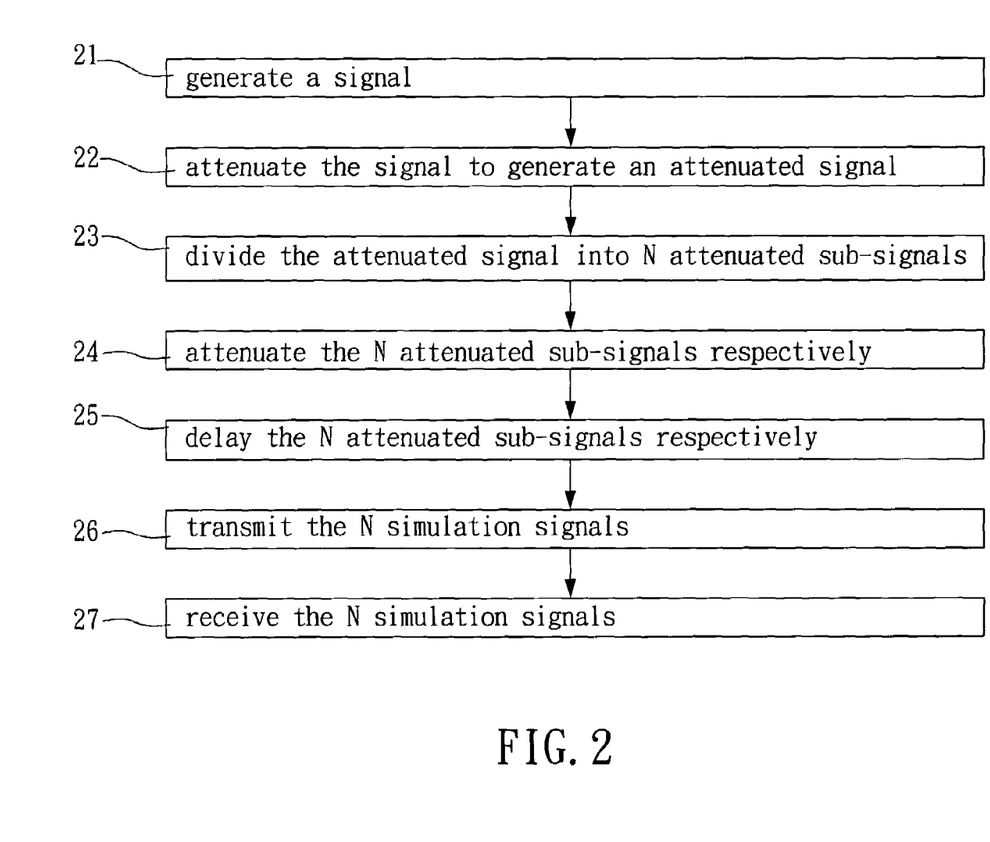
FIG. 2 is a flow chart showing a preferred embodiment of the method for multi-path simulation according to the present invention.

Next, it would be explained how to utilize the system 10a to implement the method for multi-path simulation according to the present invention. FIG. 2 is a flow chart showing a preferred embodiment of the method for multi-path simulation according to the present invention. As shown in FIG. 2, the flow chart comprises steps of:

21 generating a signal by the signal generator 11;
22 attenuating the signal by the attenuating device 121 to generate an attenuated signal;
23 dividing the attenuated signal into N attenuated sub-signals in N ways by the power divider 122;
24 attenuating the N attenuated sub-signals respectively by the N attenuators 123a to simulate the attenuations resulted from the transmission of the signal in the N paths;

25 delaying the N attenuated sub-signals respectively by the N delay lines 124 to generate N simulation signals for simulating the delays resulted from the transmission of the signal in the N paths;

26 transmitting the N simulation signals by the N antennas 141 respectively; and 27 receiving the N simulation signals by the communication device 142.

In the step 27, the turntable 144 may be rotated by the control unit 13a to change the reception azimuth of the communication device 142.

In the embodiment of FIG. 2, a reference way may be selected from the N ways, and in the step 25, N−1 delay lines 124 are used to delay N−1 ones of the attenuated sub-signals on the ways except the reference way. Also, when N is two, one more step is added between the steps 25 and 26, i.e. adjusting the phase of the attenuated sub-signal on the reference way to simulate a phase offset resulted from the signal transmission in the two paths.

In another embodiment, the system 10b is used to implement the method for multi-path simulation according to the present invention. The differences from the flow of FIG. 2 lie in the steps 22 to 25, where the step 22 is omitted; in the step 23, the signal is divided into N sub-signals by the power divider 122; in the step 24, the N sub-signals are attenuated respectively by the N attenuators 123b; and in the step 25, the N sub-signals are delayed respectively by the N delay lines 124 to generate N simulation signals.

Figure 3:
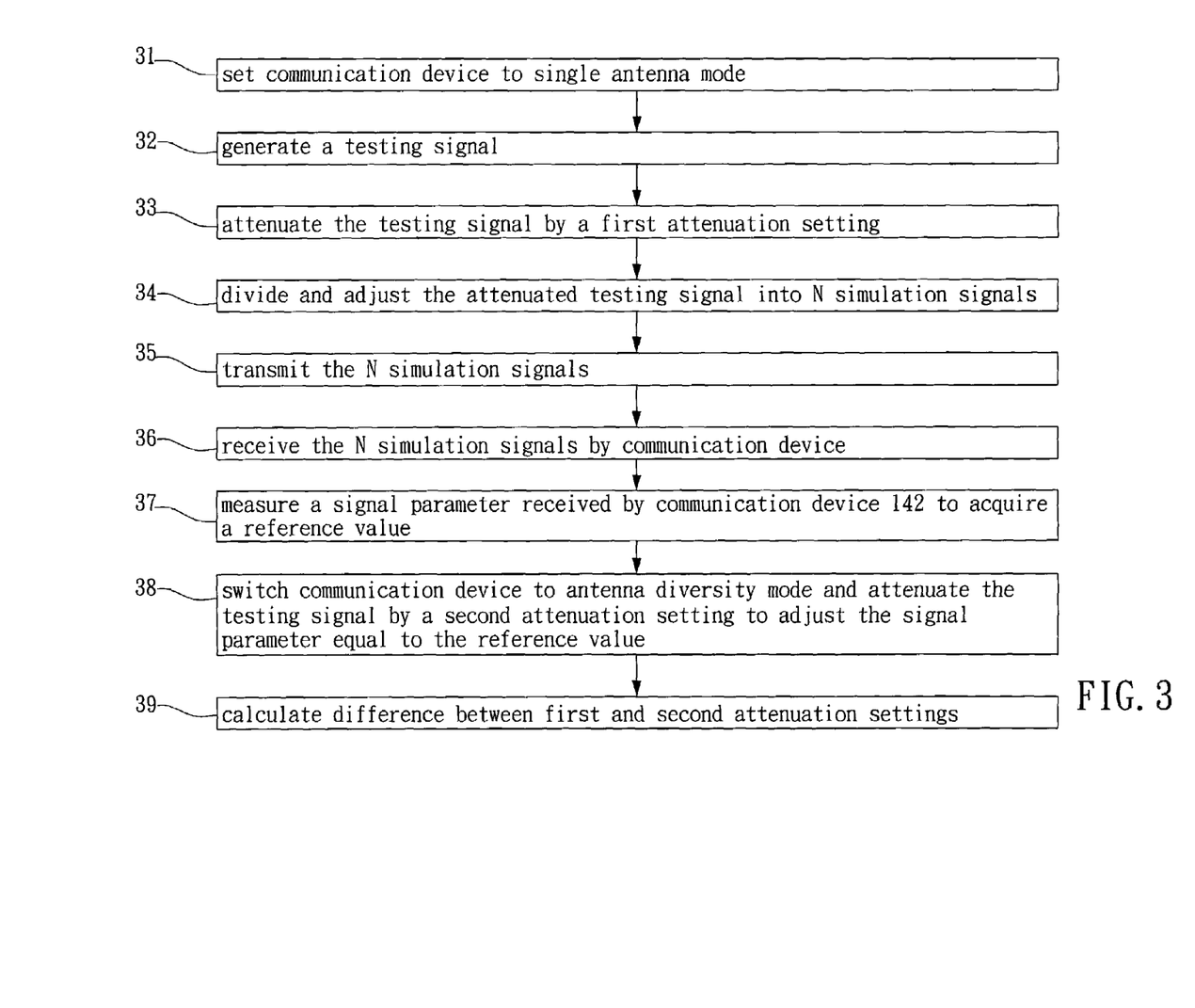

By utilizing the systems 10a and 10b for multi-path simulation, we can test a wireless communication device for reception of various signals. Next, a detailed description is provided to explain the application for measuring the diversity gain of a wireless communication device by using the system 10a and 10b respectively. Here the communication device 142 of the system 10a and 10b can be switched between a single antenna mode and an antenna diversity mode. FIG. 3 is a flow chart of the application for measuring the antenna diversity gain by using the system 10a. As shown in FIG. 3, the flow comprises the following steps:

31 setting the communication device 142 by the control unit 13a to the single antenna mode;

32 generating a testing signal by the signal generator 11;

33 attenuating the testing signal by a first attenuation setting by the attenuating device 121;

34 dividing and adjusting the attenuated testing signal into N simulation signals in N ways by the signal-simulating unit 12a to simulate attenuations and delays resulted from the transmission of the testing signal in the N paths;

35 transmitting the N simulation signals by the N antennas 141;

36 receiving the N simulation signals by the communication device 142;

37 measuring a signal parameter received by the communication device 142 by the control unit 13a to acquire a reference value;

38 switching the communication device 142 to the antenna diversity mode and attenuating the testing signal by a second attenuation setting by the control unit 13a to adjust the signal parameter equal to the reference value;

39 calculating the difference between the first and second attenuation settings by the control unit 13a, where the difference is the diversity gain of the communication device 142.

The turntable 144 can be rotated by the control unit 13a to change the reception azimuth of the communication device 142. The influence of this reception azimuth on the diversity gain can be known by repeating the steps 31 to 39 for different reception azimuths. Besides, the signal parameter mentioned above can be signal strength, a signal quality parameter or throughput.

Figure 4:
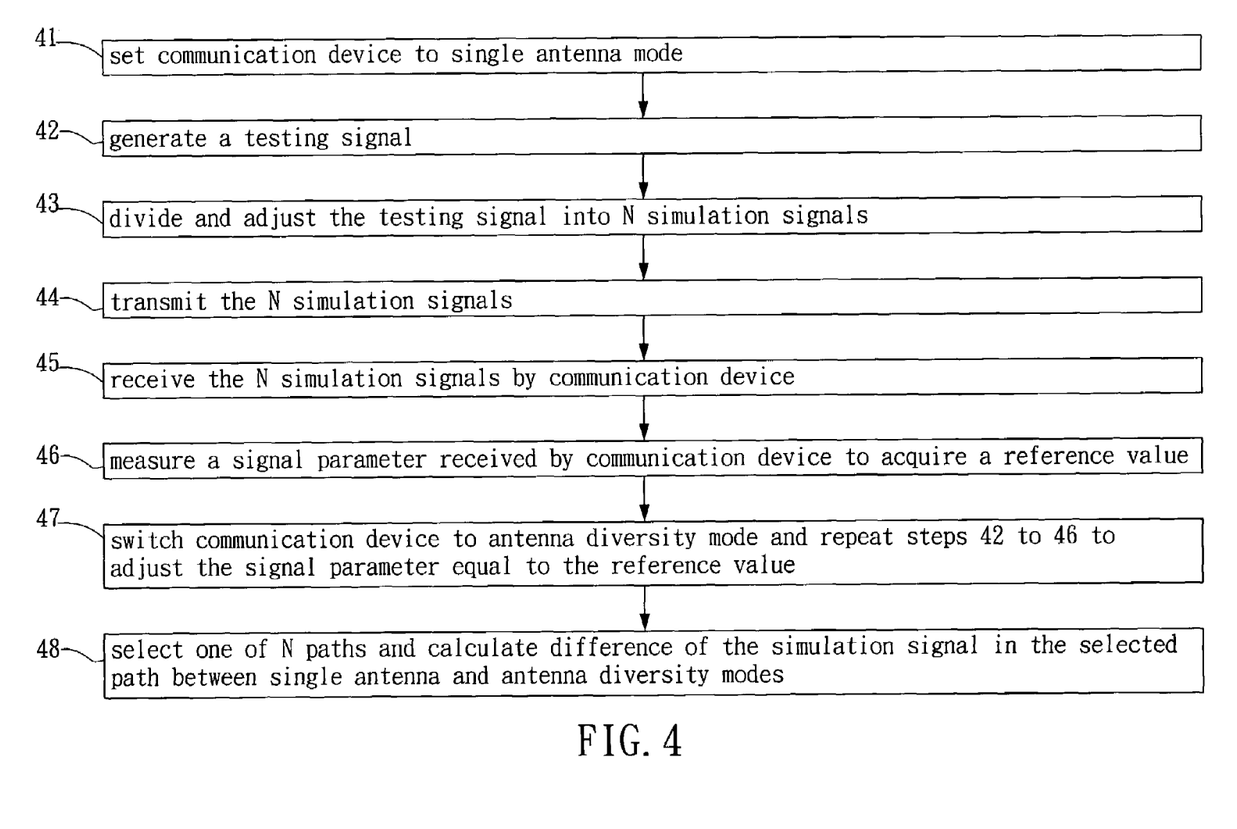
FIG. 4 is a flow chart of the application for measuring the antenna diversity gain by using the system 10b.

FIG. 4 is a flow chart of the application for measuring the antenna diversity gain by using the system 10b. Though the way of dividing and adjusting the signal in the system 10b is different from that in the system 10a, the calculation of the diversity gain is not affected. As shown in FIG. 4, the flow comprises the following steps:

41 setting the communication device 142 by the control unit 13b to the single antenna mode;

42 generating a testing signal by the signal generator 11;

43 dividing and adjusting the testing signal into N simulation signals in N ways by the signal-simulating unit 12b to simulate attenuations and delays resulted from the transmission of the testing signal in the N paths;

44 transmitting the N simulation signals by the N antennas 141;

45 receiving the N simulation signals by the communication device 142;

46 measuring a signal parameter received by the communication device 142 by the control unit 13b to acquire a reference value;

47 switching the communication device 142 to the antenna diversity mode by the control unit 13b and repeating the steps 42 to 46 to adjust the signal parameter equal to the reference value;

48 selecting one of the N ways and calculating the difference of the simulation signal in the selected way between the single antenna and antenna diversity modes by the control unit 13b, where the difference is the diversity gain of the communication device 142.

Similarly, the turntable 144 can be rotated to change the reception azimuth of the communication device 142. The influence of this reception azimuth on the diversity gain can be known by repeating the steps 41 to 48 for different reception azimuths. Besides, the signal parameter mentioned above can be signal strength, a signal quality parameter or throughput.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A system for multi-path simulation comprising:
   a signal generator for generating a signal;
   a signal-simulating unit coupled to the signal generator for dividing and adjusting the signal into N simulation signals in N ways to simulate attenuations and delays resulted from a transmission of the signal in N paths, wherein N is an integer larger than one; and
   a shielded anechoic chamber comprising N antennas which are coupled to the signal-simulating unit and used to transmit the N simulation signals respectively.

2. The system of claim 1, wherein the signal-simulating unit comprises:
   an attenuating device for attenuating the signal to generate an attenuated signal;
   a power divider coupled to the attenuating device for dividing the attenuated signal into N attenuated sub-signals;

N attenuators coupled to the power divider for attenuating the N attenuated sub-signals respectively to simulate the attenuations resulted from the transmission of the signal in the N paths; and N−1 delay lines coupled to N−1 ones of the N attenuators respectively for delaying N−1 ones of the N attenuated sub-signals to simulate the delays resulted from the transmission of the signal in N−1 ones of the N paths.

3. The system of claim 2, wherein when N is two, the two attenuators are a first and a second attenuators which attenuate a first and a second attenuated sub-signals respectively, and the signal-simulating unit further comprises:

a phase shifter coupled to the first attenuator for adjusting a phase of the first attenuated sub-signal to simulate a phase offset resulted from the transmission of the signal in the two paths.

4. The system of claim 2, wherein the attenuating device is a step attenuator.

5. The system of claim 1, wherein the signal-simulating unit comprises:

a power divider coupled to the signal generator for dividing the signal into N sub-signals;

N attenuators coupled to the power divider for attenuating the N sub-signals respectively to simulate the attenuations resulted from the transmission of the signal in the N paths; and N−1 delay lines coupled to N−1 ones of the N attenuators respectively for delaying N−1 ones of the N sub-signals to simulate the delays resulted from the transmission of the signal in N−1 ones of the N paths.

6. The system of claim 5, wherein when N is two, the two attenuators are a first and a second attenuators which attenuate a first and a second sub-signals respectively, and the signal-simulating unit further comprises:

a phase shifter coupled to the first attenuator for adjusting a phase of the first sub-signal to simulate a phase offset resulted from the transmission of the signal in the two paths.

7. The system of claim 1, wherein the shielded anechoic chamber further comprises:

a communication device for receiving the N simulation signals.

8. The system of claim 7, wherein the shielded anechoic chamber further comprises:

a turntable for setting the communication device and changing a reception azimuth of the communication device.

9. The system of claim 7, wherein the communication device is deployed in a quiet zone of the shielded anechoic chamber.

10. The system of claim 7, wherein the signal generator is a Golden Sample of the communication device.

11. The system of claim 1, wherein the signal generator is a vector signal generator.

12. A method for multi-path simulation comprising:

generating a signal;

dividing and adjusting the signal into N simulation signals in N ways to simulate attenuations and delays resulted from a transmission of the signal in N paths, wherein N is an integer larger than one;

transmitting the N simulation signals by N antennas deployed in a shielded anechoic chamber, respectively; and receiving the N simulation signals by a communication device deployed within the shielded anechoic chamber.

13. The method of claim 12, wherein the signal is generated by a vector signal generator.

14. The method of claim 12, wherein the signal is generated by a Golden Sample of the communication device.

15. The method of claim 12, wherein the dividing and adjusting step comprises:

attenuating the signal to generate an attenuated signal;

dividing the attenuated signal into N attenuated sub-signals;

attenuating the N attenuated sub-signals respectively to simulate the attenuations resulted from the transmission of the signal in the N paths; and delaying the N attenuated sub-signals respectively to simulate the delays resulted from the transmission of the signal in the N paths.

16. The method of claim 15, wherein when N is two, the attenuated signal is divided into a first and a second attenuated sub-signals, and the dividing and adjusting step further comprises:

adjusting a phase of the first attenuated sub-signal to simulate a phase offset resulted from the transmission of the signal in the two paths.

17. The method of claim 15, wherein the signal is attenuated to generate the attenuated signal by a step attenuator.

18. The method of claim 12, wherein the dividing and adjusting step comprises:

dividing the signal into N sub-signals;

attenuating the N sub-signals respectively to simulate the attenuations resulted from the transmission of the signal in the N paths; and delaying the N sub-signals respectively to simulate the delays resulted from the transmission of the signal in the N paths.

19. A method for measuring a diversity gain of a communication device, the communication device being able to switch between a single antenna mode and an antenna diversity mode and deployed within a shielded anechoic chamber, the method comprising:

setting the communication device to the single antenna mode;

generating a testing signal;

attenuating the testing signal by a first attenuation setting;

dividing and adjusting the attenuated testing signal into N simulation signals in N ways to simulate attenuations and delays resulted from a transmission of the testing signal in N paths, wherein N is an integer larger than one;

transmitting the N simulation signals by N antennas deployed within the shielded anechoic chamber;

receiving the N simulation signals by the communication device;

measuring a signal parameter received by the communication device to acquire a reference value;

switching the communication device to the antenna diversity mode and attenuating the testing signal by a second attenuation setting to adjust the signal parameter equal to the reference value; and calculating a difference between the first and second attenuation settings to obtain the diversity gain of the communication device.

20. The method of claim 19, wherein the testing signal is generated by a vector signal generator.

21. The method of claim 19, wherein the testing signal is generated by a Golden Sample of the communication device.

22. The method of claim 19, wherein the testing signal is attenuated by the first and second attenuation settings by a step attenuator.

23. The method of claim 19, wherein the signal parameter is selected from a group consisting of signal strength, a signal quality parameter and throughput.

24. A method for measuring a diversity gain of a communication device, the communication device being able to switch between a single antenna mode and an antenna diversity mode and deployed within a shielded anechoic chamber, the method comprising steps of:
   a. setting the communication device to the single antenna mode;
   b. generating a testing signal;
   c. dividing and adjusting the testing signal into N simulation signals in N ways to simulate attenuations and delays resulted from a transmission of the testing signal in N paths, wherein N is an integer larger than one;
   d. transmitting the N simulation signals by N antennas deployed within the shielded anechoic chamber;
   e. receiving the N simulation signals by the communication device;
   f. measuring a signal parameter received by the communication device to acquire a reference value;
   g. switching the communication device to the antenna diversity mode and repeating the steps b to f to adjust the signal parameter equal to the reference value; and
   h. selecting one of the N ways and calculating a difference of the simulation signal in the selected way between the single antenna and antenna diversity modes to obtain the diversity gain of the communication device.

* * * * *